July 4, 1967     A. P. PFEIL     3,329,174
LINED HOLLOW WOOD BODY

Filed July 1, 1964     3 Sheets-Sheet 1

INVENTOR.
ARTHUR P. PFEIL
BY
*Christel & Bean*
ATTORNEYS

July 4, 1967  A. P. PFEIL  3,329,174
LINED HOLLOW WOOD BODY

Filed July 1, 1964  3 Sheets-Sheet 2

INVENTOR.
ARTHUR P. PFEIL
BY
Christel & Bean
ATTORNEYS

July 4, 1967  A. P. PFEIL  3,329,174
LINED HOLLOW WOOD BODY
Filed July 1, 1964  3 Sheets-Sheet 3

INVENTOR.
ARTHUR P. PFEIL
BY
Christel & Bean
ATTORNEYS

United States Patent Office 3,329,174
Patented July 4, 1967

3,329,174
LINED HOLLOW WOOD BODY
Arthur P. Pfeil, Williamsville, N.Y., assignor to Arrow Tank Company Inc., Buffalo, N.Y.
Filed July 1, 1964, Ser. No. 379,543
8 Claims. (Cl. 138—141)

This invention relates to a lined hollow wood body such as a wood tank, wood pipe, conduit and the like.

An object of the present invention is to provide an improved hollow wood body, more particularly a tank, wood pipe, conduit or the like, constructed of staves and having a lined inner surface wherein the lining is secured or bonded to the inner surface of the body or construction in a novel manner to provide a fluid tight structure.

Another object of the invention is to provide a construction of the character referred to wherein the individual staves carry inner surface coverings which extend partway over the longitudinal edge surfaces of the staves and wherein the partially covered edge surfaces are formed to provide, in cooperation with corresponding mating surfaces in the assembling of the staves to form the hollow body, a passageway to receive a sealing and key forming material.

Another object of the invention is to provide a lined hollow wood body formed of stave sections having individual inner surface protective coatings and bonded or sealed together at and between mating edges thereof to form the complete lining.

Another object of the invention is to provide a lined hollow wood body of the character stated, made up of stave sections, wherein each of the stave sections has a plastic surface coating over the inner face thereof with novel sealing and keying means between abutting or mating edge faces of the stave sections, formed of a resin which sealingly bonds the adjacent edges of the plastic coatings together.

Still another object of the invention is to provide a construction of the character above set forth with novel means for bonding the plastic coatings to the inner surfaces of the stave sections whereby the coatings will be held in position.

Still another object of the invention is to provide in a lined hollow wood body of the character stated, constructed of staves or individual sections, a novel means of attaching to the inner surface of each section, a plastic covering which insures retention of the covering or lining on the stave section even if the bond between the coating and the surface of the stave should separate.

Other objects and advantages of the invention will become apparent as the description of the same proceeds and the invention will be best understood from a consideration of the following detailed description taken in connection with the accompanying drawings, wherein.

Figure 1:
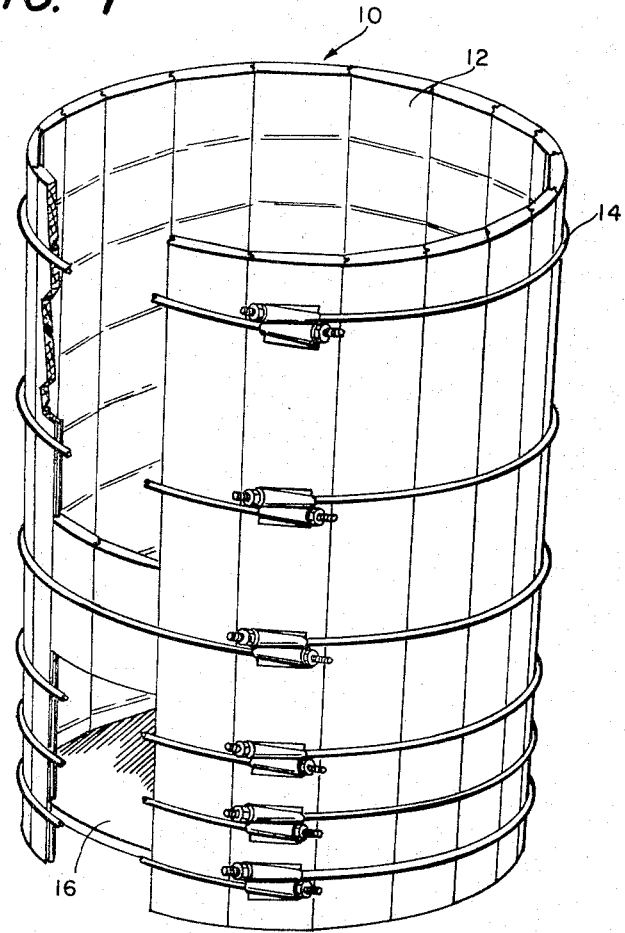
FIGURE 1 is a perspective view illustrating a wood tank or wood pipe section constructed in accordance with one embodiment of the present invention with portions of certain of the staves thereof broken away to show details of construction.
Figure 3:
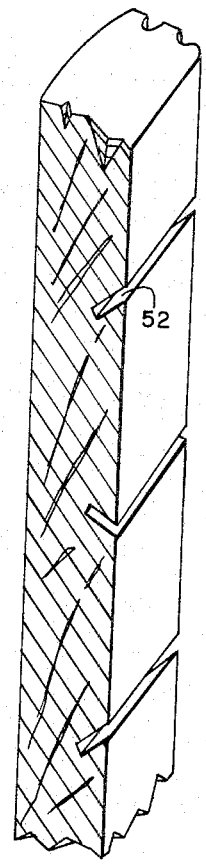
FIGURE 3 is a fragmentary detail on an enlarged scale of a portion of a stave before the application of the lining material thereto and showing transverse slots for receiving locking resin.

Referring now more particularly to the drawings, the numeral 10 generally designates a wood tank or wood pipe section comprised of the stave sections 12 secured together in longitudinal edge to edge relation in the conventional manner of constructing tanks of wood, by means of the conventional adjustable hoops 14.

The numeral 16 designates the bottom of the tank, the periphery of which is set in the rabbet or croze 18 formed in the inner faces of the stave sections 12.

Each stave or stave section 12 has the transversely curved or arcuate outer surface 20 and the transversely flat or straight inner surface 22 for the shortest span.

The numeral 24 designates the longitudinal inner edge faces of the stave, one of which edge faces is provided with the longitudinal groove 26 while the opposite longitudinal edge face is formed with the longitudinal tongue 28 which is adapted to seat in the groove of an adjacent stave in the conventional manner of assembled wood staves.

While a tongue and groove connecting means is here shown for joining the opposing or mating edges of the staves, it is to be understood that the invention is not limited to this specific construction as it will be obvious the opposing edge faces of the staves may be formed to have other configurations which facilitate placing them tightly together or in asembled relation.

The structure of FIGURE 1 has been illustrated as that of a tank provided with a bottom which has been designated 16 and wherein the top and bottom ends of the staves are shown lying in a common transverse plane or, in other words, the staves are all shown as being of the same length.

Figure 5:
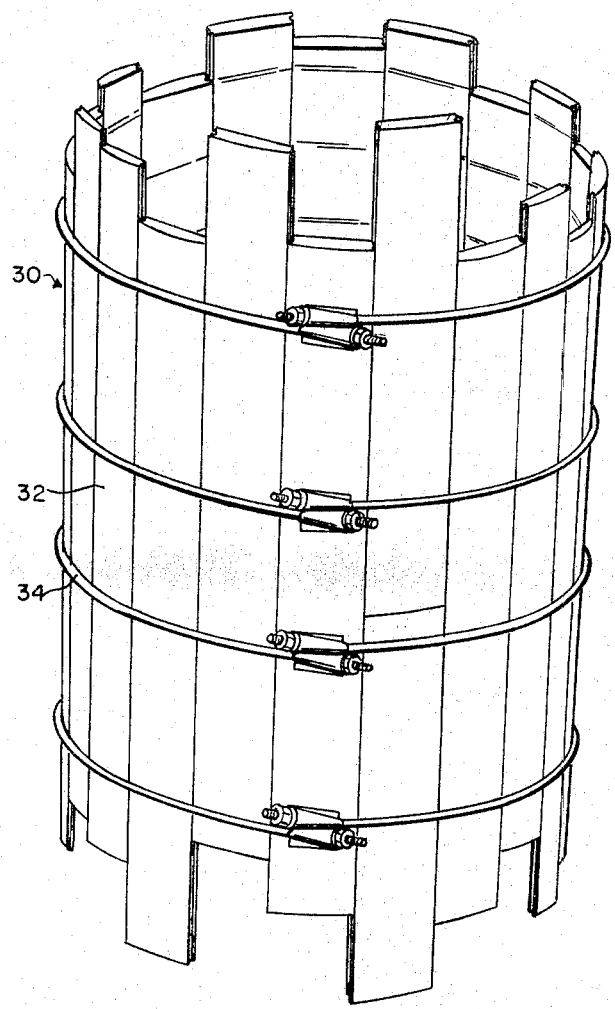
FIGURE 5 is a perspective view of a wood pipe section constructed in accordance with the present invention.

FIGURE 5 illustrates a wood pipe construction which is generally designated 30 and which is also made up of a plurality of staves or stave sections which are designated 32 and which are held together in assembled relation by the clamping bands or adjustable hoops 34.

In the structure of FIGURE 5 the staves are in staggered relationship whereby the ends of the section have a more or less crenalated configuration to facilitate the coupling of a number of such conduit or pipe sections together.

The invention is applicable to both the tank, and wood pipe forms of hollow wood body, here shown, formed of stave sections. Accordingly, the description of the invention will be directed particularly to the tank construction, it being understood that it is applicable to corresponding parts of the pipe or conduit construction as well.

In carrying out the invention each stave 12, or 32, is formed at each inner longitudinal corner with an undercut shoulder 36 which extends the length of the stave. The undercut portion of the shoulder is in the longitudinal edge face forwardly or outwardly from the flat inner face or surface 22 of the stave whereby there is formed the groove 38 in the edge face.

The undercut shoulder 36 is here illustrated as being rounded or approximately semi-circular in cross section and merging at its inner side at 40 with the inner face 22 while the opposite or outer side of the shoulder curves aterally into the groove 38 as indicated at 42. However, the cross sectional contour or shape of the shoulder does not necessarily have to be semi-circular but may take any desired form, the essential feature residing in the undercut whereby to provide the longitudinal groove 38.

Figure 2:
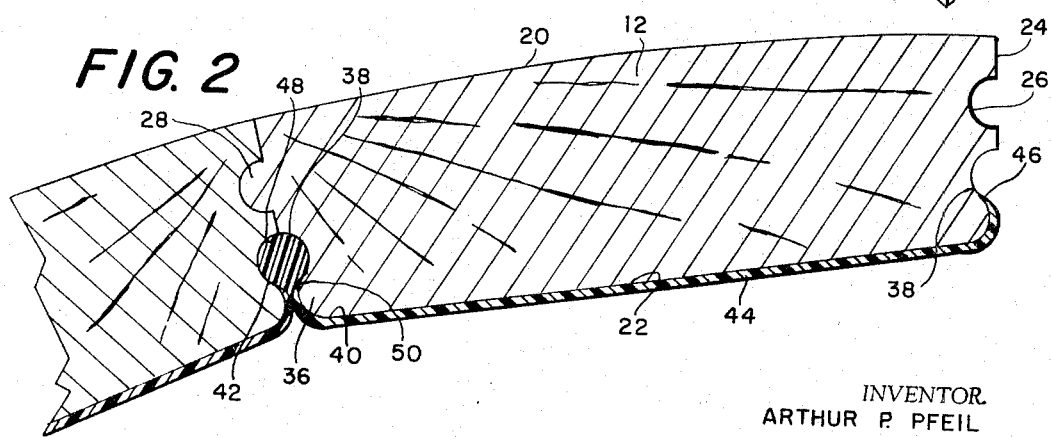
FIGURE 2 shows on an enlarged scale a transverse section through a complete stave and a portion of another stave joined thereto and illustrating the plastic liner coatings on the inner surface of the staves and the sealing key therebetween.
Figure 9:
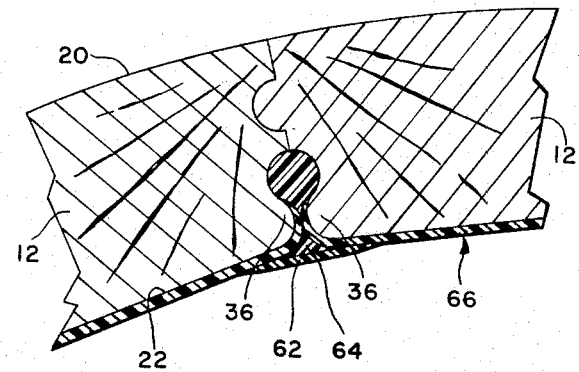
FIGURE 9 is a sectional detail corresponding to FIGURE 2 and showing the plastic sealing strip covering the joint between adjacent longitudinal edges of the plastic coating bodies on two stave sections.

Also, while not essential, it is preferable that the projection of the shoulder 36 be slightly short of the plane of the edge face 24 in which it is formed whereby when the staves are assembled in edge abutting or edge mating relation as shown in FIGURE 2, there will be a slight separation or space between the opposing shoulders 36 which will be taken up or filled by the material of the plastic liner as hereinafter set forth and as shown in FIGURES 2 and 9.

In one embodiment of the invention the inner surface 22 of each stave 12 has applied thereover a layer, or layers, of a synthetic resin plastic, preference being had for a fiberglass reinforced plastic. This layer of plastic is designated 44 and the opposite longitudinal edges of the plastic layer are carried outwardly across and around the shoulders 36 and into the surface of the adjacent groove 38. Preferably the portion of the plastic liner 44 which extends into the groove 38 is tapered off as indicated at 46 so as not to fill the groove.

When the staves are assembled in the construction of the tank or the wood pipe, the portions of the plastic liner which extend across the shoulders 36 will together substantially fill the space between the opposing shoulders as illustrated.

The opposing grooves 38 will, together, form a channel 48 extending longitudinally of the staves and this channel is then filled by injecting a suitable synthetic resin gel such as a polyester gel or epoxy, under pressure, thereinto thereby forming a sealing and locking key 50 between the edges of the staves.

The plastic liner 44 may be applied in the form of a mat or mats and bonded to the surface 22 of the stave and to each other.

Figure 4:
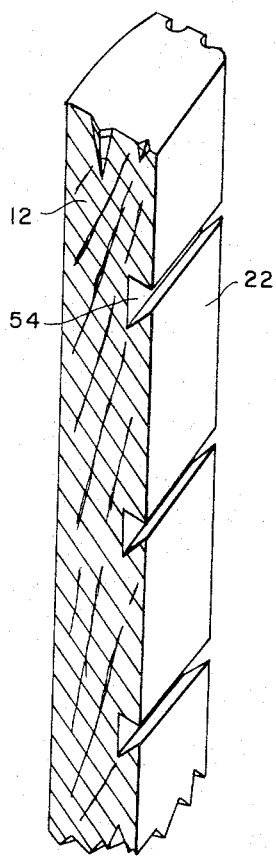
FIGURE 4 is a fragmentary detail on an enlarged scale of a portion of a stave, corresponding to FIGURE 3 and showing a dove-tail form slot for receiving locking resin.

Any suitable means may be employed for bonding the plastic to the surface 22 of the stave. Preferably, transverse grooves or channels also are formed in the face 22 and filled with resin material to which the liner 44 is adhered. Such channels might be in the form of slots 52, inclined in opposite directions to face 22 and made as ordinary saw cut slots as shown, or such slots may be of dove-tail form as indicated at 54 in FIGURE 4. When the plastic liner is applied it will be caused to be bonded to or fused with the resin material 56 as illustrated in FIGURE 8, as well as to the stave surface 22.

Where the periphery of the bottom or bottom wall 16 of the tank is introduced into the rabbet 18, formed in the staves, the groove 38 is carried across the width of the stave in the upper wall portion of the rabbet 18, as indicated at 58. The top surface of the bottom 16 also carries a lining layer 60 of the plastic and thus it will be seen that the resin when it is injected into the passageway or channel 48 will flow across the stave and be bonded to the bottom wall lining material 60.

Figure 8:
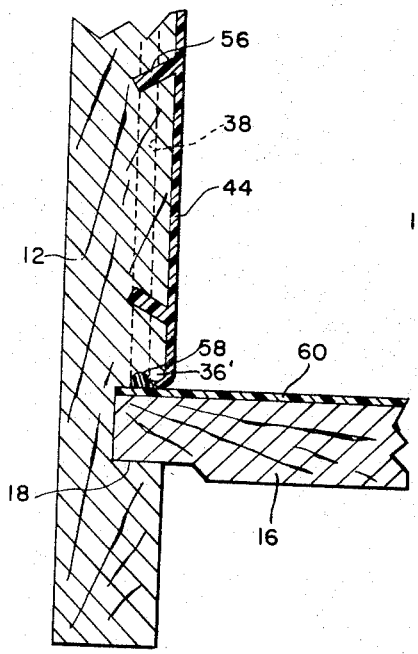
FIGURE 8 is a vertical section through a portion of the lower end of a stave section and a portion of the bottom of a tank such as that shown in FIGURE 1.

Each stave 12 also can be formed at the inner, upper edge of croze 18 with an undercut shoulder 36' extending the width of the stave as shown in FIG. 8. The undercut portion is forwardly or outwardly from the inner face 22 of the stave, forming part of groove 58, and the plastic liner extends therearound and into groove 58 in the same manner as described above with reference to the opposite sides of the stave. The shoulder 36' preferably is slightly short of the top surface of bottom 16, the space therebetween being filled up by the lining material 44, 60. The liner material 44 below bottom 16 may be omitted if it is not needed.

The resin 56 in the slots 52 or 54 acts as keys to hold the plastic liner in place against the inner surface of the stave. If, however, the bond between the liner and the inner surface of the stave should fail for any reason the edge portions of the liner which extend across the shoulders 36 and into the grooves 38 will retain the lining in position.

Figure 6:
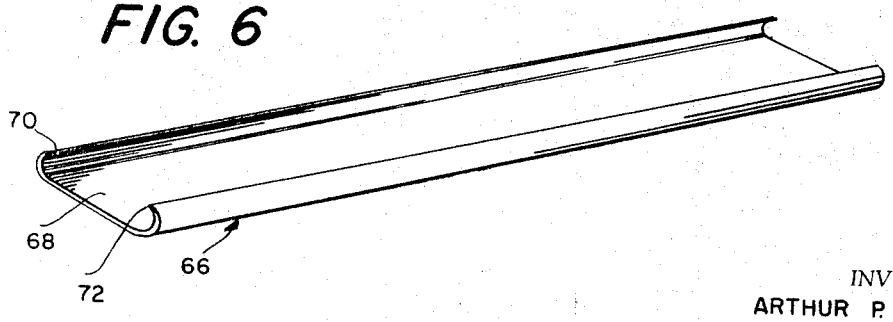
FIGURE 6 is a perspective view of a pre-formed or extruded plastic body for application to a stave section.

Another manner of applying the plastic liner to the inner face of the stave is to form the plastic material as an extrusion unit as illustrated in FIGURE 6. This unit is here generally designated 66 and as shown it comprises the flat body portion 68 bordered by the inturned substantially semi-circular edge flanges 70 which are tapered to a thin longitudinal edge as indicated at 72.

As will be readily apparent from a consideration of FIGURE 6, this extruded plastic unit may be slip fitted over the flat inner face 22 of the stave. In this operation the rounded flanges 70 will engage over and around the shoulders 36 and extend into the grooves 38.

If desired the joint between the staves may have applied thereover a plastic cover strip as indicated at 62 in FIGURE 9. When the liners of adjacent staves do not tightly abut the filler resin, forming the key between the stave sections, when injected under pressure in the channel 48 will escape between the lined shoulders 36 and fill up the space between the strip 62 and the abutting portions of the liner, as indicated at 64 in FIGURE 9.

Figure 7:
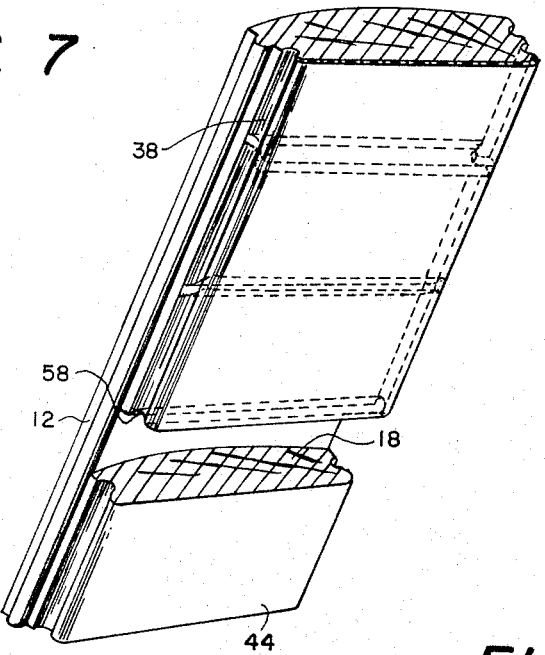
FIGURE 7 is a perspective view of a portion of a stave section with portions thereof broken away and showing the plastic coating member applied thereto.

FIGURE 7 shows the lower end of the inner face of the stave 12 in which the rabbet 18 is formed to receive the edge or periphery of the bottom wall 16 and this view shows the transverse groove 58 which joins the longitudinal grooves 38.

The plastic material employed may comprise a polyvinyl chloride, reinforced with fiberglass or unreinforced as desired. Thus, when employing fiberglass reinforcement, as in mats, the structure when set up will be lined with a fiberglass reinforced polyester which is the preferred form of lining. However, any other suitable preferred form of lining may be employed.

From the foregoing it will be seen that there is provided by the present invention a novel lined hollow wood body which can be readily transported in knocked down form or condition and readily assembled at the place of use.

The resin filled slots to which the liner material is bonded, in addition to forming locking keys for the liner material, also stops cracking in the plastic, provides a mechanical lock and also provides reinforcing ribs.

While it has been stated that the plastic may be applied in sheets, with or without fiberglass, it is also contemplated to apply the plastic by spraying.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

I claim:

1. The method of making a lined hollow body such as a tank, conduit and the like which comprises, forming plural longitudinal stave units each having longitudinal edge faces and inner and outer faces, said longitudinal edge faces each having a longitudinally extending undercut shoulder providing a longitudinal groove disposed outwardly of the shoulder from said inner face, and a liner of plastic material covering the inner face of each stave, said liner extending outwardly across each shoulder into the grooves therebehind, assembling said staves with adjacent edge faces thereof in abutting relation and with said longitudinal grooves in said abutting faces in opposed relation forming longitudinal passages, securing said staves in assembled relation, and injecting a resin gel into said passages under pressure.

2. The invention as defined by claim 1 wherein said liner is bonded to said inner face by bonding means comprise a plastic carried in grooves formed in and across said inner face of the stave.

3. The invention as defined by claim 1 wherein said longitudinal edge faces have a tongue on one and a groove in the other.

4. The invention as defined by claim 1 wherein said liner is fiberglass reinforced.

5. The invention as defined in claim 1, wherein said liner consists of an elongate preformed sheet having inturned longitudinal edge flanges for receiving said shoulders.

6. A lined hollow body such as a tank, conduit and the like, comprising a number of longitudinal stave units each having longitudinal edge faces and inner and outer faces, said longitudinal edge faces each having a longitudinally extending undercut shoulder providing a longitudinal groove disposed outwardly of the shoulder from said inner face, the staves having adjacent edge faces in abutting relation and said longitudinal grooves in said abutting faces being in opposed relation and forming longitudinal passages, a liner material covering the inner face of each of said staves and extending outwardly across each shoulder into an adjacent groove, means securing said staves together in assembled relation, and a sealing material in each of said passages and sealingly joining the adjacent shoulder covering portions of the liners wherein each stave and the liner thereon has a rabbet formed in and transversely of each inner face adjacent to one end of the stave, said rabbets being joined to form a continuous rabbet upon the inner side of the body, a bottom for the body having its periphery in said continuous rabbet, and a liner covering the inner surface of said bottom and joining the liner material on the staves and wherein said continuous rabbet has a top surface in which there is a continuous groove which joins the longitudinal edge grooves of the staves and into which said sealing material extends for sealing contact with the bottom covering liner.

7. The invention as defined by claim 6, wherein said continuous groove is provided in part by a transversely extending undercut shoulder along said top surface of said rabbet, said liner material also extending outwardly across said transversely extending shoulder into said continuous groove.

8. A lined hollow body such as a tank, conduit and the like, comprising a number of longitudinal stave units each having longitudinal edge faces and inner and outer faces, said longitudinal edge faces each having a longitudinally extending undercut shoulder providing a longitudinal groove disposed outwardly of the shoulder from said inner face, the staves having adjacent edge faces in abutting relation and said longitudinal grooves in said abutting faces being in opposed relation and forming longitudinal passages, a liner material covering the inner face of each of said staves and extending outwardly across each shoulder into an adjacent groove, means securing said staves together in assembled relation, and a sealing material in each of said passages and sealingly joining the adjacent shoulder covering portions of the liners with a sealing strip secured to the inner surface of the liner of each stave longitudinally of the latter and spanning the adjacent portions of the liners which extend outwardly across adjacent shoulders, and sealing material between said sealing strip and the said adjacent portions of the liners.

References Cited

UNITED STATES PATENTS

| 749,693 | 1/1904 | Kremer | 138—157 |
| 1,549,078 | 8/1925 | Ferguson | 138—141 |
| 2,020,256 | 11/1935 | Copeman. | |
| 3,095,014 | 6/1963 | Dosker | 138—151 |

FOREIGN PATENTS

| 411,707 | 3/1925 | Germany. |
| 4,245 | 1/1895 | Norway. |

LAVERNE D. GEIGER, *Primary Examiner.*

T. L. MOORHEAD, *Assistant Examiner.*